United States Patent [19]
Hinkel

[11] Patent Number: 5,706,656
[45] Date of Patent: Jan. 13, 1998

[54] HYDROKINETIC TORQUE CONVERTER AND METHOD OF MANUFACTURE THEREOF

[75] Inventor: Rüdiger Hinkel, Röthlein, Germany

[73] Assignee: Fichtel & Sachs AG, Schweinfurt, Germany

[21] Appl. No.: 628,542

[22] Filed: Apr. 10, 1996

[30] Foreign Application Priority Data

Apr. 10, 1995 [DE] Germany .......................... 195 13 517.2

[51] Int. Cl.[6] ...................................................... F16D 33/00
[52] U.S. Cl. .............................. 60/345; 60/330; 29/889.5; 416/180; 416/197 C
[58] Field of Search ..................... 60/330, 345; 416/180, 416/197 C; 29/889.27, 899.5

[56] References Cited

U.S. PATENT DOCUMENTS

| | | | |
|---|---|---|---|
| 2,216,747 | 10/1940 | Klimek | 416/180 |
| 2,556,676 | 6/1951 | Carnegie | 416/180 |
| 2,663,996 | 12/1953 | Stalker | 416/180 |
| 3,550,234 | 12/1970 | Herold . | |
| 3,873,237 | 3/1975 | Tokunaga | 416/197 C |

*Primary Examiner*—F. Daniel Lopez
*Attorney, Agent, or Firm*—Nils H. Ljungman and Associates

[57] ABSTRACT

A hydrokinetic torque converter which includes pump wheels and/or turbine wheels in particular of a Föttinger coupling, wherein all the required blades are stamped in the form of blade blanks, out of a round stamping blank in a single operating process, in such a manner that each blade blank remains connected, by means of a connecting web, to a ring-shaped area of the stamping blank which remains intact during the stamping. The blade blanks are then subjected to a shaping process, in which they are reshaped into the final three-dimensional shape of the blade, whereby the connection with the ring-shaped area remains intact, and, in a shaping process, the ring-shaped area is adapted to the contour of the housing that delimits the pump wheel or turbine wheel. A blade carrier is thereby produced which makes it possible to install all the blades, in their three-dimensional position with respect to the pump or turbine wheel, in a single process.

10 Claims, 4 Drawing Sheets

HYDROKINETIC TORQUE CONVERTER AND METHOD OF MANUFACTURE THEREOF

BACKGROUND OF THE INVENTION

1. Field of the Invention

The present invention relates to hydrokinetic torque converters and to a method for the manufacture of blades for pump wheels and/or turbine wheels of a fluid coupling (in particular of a Föttinger coupling), or of a torque converter for motor vehicles. The invention also relates to blades manufactured using this method.

2. Background Information

Fluid couplings and hydrodynamic torque converters transmit torque by the hydrodynamic forces of a fluid. In a pump, mechanical energy is converted into hydrodynamic energy of the fluid, which is then converted back into mechanical energy in a turbine, by diversion of fluid flow in the blade channel. The pump and the turbine are primarily wheels which are provided with blades to form the pump wheel or turbine wheel. The blades are curved in three dimensions, and can have various shapes.

The blades are normally individually stamped out of sheet metal and then bent into their final shape. To be able to assemble the individual blades into a pump wheel or turbine wheel, U.S. Pat. No. 3,550,234, for example, relates to a method in which these blades can be provided with tabs which are inserted into corresponding slots and which can be bent. To keep the hydrodynamic losses as low as possible, the blades are then soldered or welded to the housing, so that there is virtually no gap between a blade and the wall of the housing.

The assembly of such a clutch or of such a torque converter is an extremely complex, time-consuming and expensive operation, because each blade must be installed into, and connected to, the respective housing part (e.g., the pump wheel outer shell and/or turbine wheel outer shell) individually. Each blade must be handled individually for the bending process (during the manufacture of the blades) and during the assembly process. If there are approximately 30 blades for each pump wheel or turbine wheel, for example, a correspondingly large number of personnel and long assembly times are required, which necessarily increases the manufacturing costs.

OBJECT OF THE INVENTION

One object of the present invention is the provision of a method for the manufacture of blades which makes it possible to simplify the process and to reduce the time required to assemble a fluid coupling or a hydrodynamic torque converter.

SUMMARY OF THE INVENTION

The invention teaches that this object can be accomplished as follows: by stamping all the blades required as blade blanks from a preferably round stamping blank and in a single process; by leaving each blade blank connected, by means of a connecting web, to a ring-shaped area of the stamping blank which remains intact during the stamping; by then subjecting the blade blanks to a shaping process in which they are reshaped into the definitive three-dimensional shape of the blade, whereby the connection with the ring-shaped area remains intact; and by adapting the ring-shaped area, in a shaping process, to the contour of the housing (e.g., the pump wheel outer shell and/or turbine wheel outer shell) that encases the pump wheel or turbine wheel.

A composite assembly of blades manufactured in this manner can be inserted all at once, in the corresponding required three-dimensional position, into one of the housing parts, and can be connected as a composite assembly to the housing (e.g., outer shell) of the pump wheel and/or turbine wheel via the ring-shaped area.

In the shaping process which is performed following the stamping process, even complicated three-dimensional shapes can be realized, so that it can be guaranteed that the blade geometry can be adapted to meet hydrodynamic requirements. The process of bending the blades, which previously had to be performed individually, can now be done for all the blades simultaneously while they remain in the composite assembly. The carrier ring, as well as the web which fastens the blades to the carrier ring, can be placed in any three-dimensional position, for which purpose the corresponding manufacturing technologies are available.

The carrier ring can be located either or both radially inwardly and radially outwardly in the assembly. To reinforce the pump wheel or turbine wheel which is formed, each web is preferably provided with a slot-shaped recess, into which a tab provided on each blade can be inserted, so that the rigidity of the blade assembly can be increased. The position and shape of the web between the blade and the carrier ring can be adapted to meet the requirements of the three-dimensional shape of the blades.

To achieve a specified required number of blades, it is also possible to insert two or more prefabricated blade carriers, for example, into the housing (e.g., the outer shell of the pump wheel and/or turbine wheel).

In summary, one aspect of the present invention resides broadly in a hydrokinetic torque converter, such as for a motor vehicle, the motor vehicle including a power output shaft, the hydrokinetic torque converter comprising: a pump wheel, the pump wheel comprising: a pump wall; the pump wall comprising a first inner portion; the first inner portion for being disposed substantially adjacent to the power output shaft; a pump wheel outer shell; and a plurality of pump blades connected to the pump wheel outer shell; the pump wheel for being connected to a source for providing power; a turbine wheel, the turbine wheel comprising: a turbine wall; the turbine wall comprising a second inner portion; the second inner portion for being disposed substantially adjacent to the power output shaft; a turbine wheel outer shell; and a plurality of turbine blades connected to the turbine wheel outer shell; the pump wheel and the turbine wheel being disposed such that the plurality of the pump blades of the pump wheel and the plurality of the turbine blades of the turbine wheel are adjacent to and face one another; the pump wheel outer shell and the turbine wheel outer shell enclosing the pump blades and the turbine blades adjacent to and facing one another; the turbine wheel being connected to and for driving the power output shaft; stator means, the stator means being disposed between the turbine wheel and the pump wheel; the stator means comprising an overrunning clutch unit; and at least one of the plurality of pump blades and the plurality of turbine blades comprising a blade assembly positioned within one of the pump wheel outer shell and the turbine wheel outer shell, the blade assembly comprising: at least two blade portions; a connecting portion disposed adjacent the at least two blade portions; and a web portion connecting each of the at least two blade portions to the connecting portion; the at least two blade portions, the connecting portion and the web portions all being formed from a single sheet of material; the connecting portion of the blade assembly being attached to the one of the pump wheel outer shell and the turbine wheel outer shell to thereby connect the blade assembly to and position the blade assembly with respect to the one of the pump wheel outer shell and the turbine wheel outer shell.

In summary, another aspect of the present invention resides broadly in a method of manufacturing a hydrokinetic torque converter, such as for a motor vehicle, the motor vehicle including a power output shaft, the hydrokinetic torque converter comprising: a pump wheel, the pump wheel comprising: a pump wall; the pump wall comprising a first inner portion; the first inner portion for being disposed substantially adjacent to the power output shaft; a pump wheel outer shell; and a plurality of pump blades connected to the pump wheel outer shell; the pump wheel for being connected to a source for providing power; a turbine wheel, the turbine wheel comprising: a turbine wall; the turbine wall comprising a second inner portion; the second inner portion for being disposed substantially adjacent to the power output shaft; a turbine wheel outer shell; and a plurality of turbine blades connected to the turbine wheel outer shell; the pump wheel and the turbine wheel being disposed such that the plurality of the pump blades of the pump wheel and the plurality of the turbine blades of the turbine wheel are adjacent to and face one another; the pump wheel outer shell and the turbine wheel outer shell enclosing the pump blades and the turbine blades adjacent to and facing one another; the turbine wheel being connected to and for driving the power output shaft; stator means, the stator means being disposed between the turbine wheel and the pump wheel; the stator means comprising an overrunning clutch unit; and at least one of the plurality of pump blades and the plurality of turbine blades comprising a blade assembly positioned within one of the pump wheel outer shell and the turbine wheel outer shell, the blade assembly comprising: at least two blade portions; a connecting portion disposed adjacent the at least two blade portions; and a web portion connecting each of the at least two blade portions to the connecting portion; the at least two blade portions, the connecting portion and the web portions all being formed from a single sheet of material; the connecting portion of the blade assembly being attached to the one of the pump wheel outer shell and the turbine wheel outer shell to thereby connect the blade assembly to and position the blade assembly with respect to the one of the pump wheel outer shell and the turbine wheel outer shell; the method comprising the steps of: providing the power output shaft; providing the pump wheel; providing the turbine wheel; providing the stator means; forming the blade assembly comprising the at least two blade portions, the connecting portion and the web portions in a forming process from the single sheet of material; and shaping the at least two blade portions into a final configuration while the at least two blade portions are still connected to the connecting portion by the web portions; the method comprising the further steps of: attaching the connecting portion of the blade assembly to the one of the pump wheel outer shell and the turbine wheel outer shell to thereby connect the blade assembly to and position the blade assembly with respect to the one of the pump wheel outer shell and the turbine wheel outer shell; positioning the pump wheel and the turbine wheel adjacent to and facing one another; and disposing the stator means between the pump wheel and the turbine wheel.

In summary, a further aspect of the present invention resides broadly in a method of manufacturing a hydrokinetic torque converter, the hydrokinetic torque converter including a pump wheel, a turbine wheel, and stator means, the pump wheel including a pump wheel outer shell and a plurality of pump blades connected to the pump wheel outer shell, the turbine wheel including a turbine wheel outer shell and a plurality of turbine blades connected to the turbine wheel outer shell, the stator means including an overrunning clutch unit, the method comprising the steps of: forming a blade assembly in a forming process, the blade assembly comprising: at least two blade portions; a connecting portion disposed adjacent the at least two blade portions; and a web portion connecting each of the at least two blade portions to the connecting portion; the at least two blade portions, the connecting portion and the web portions all being formed from a single sheet of material; shaping the at least two blade portions into a final configuration while the at least two blade portions are still connected to the connecting portion by the web portions; attaching the connecting portion of the blade assembly to one of the pump wheel outer shell and the turbine wheel outer shell to thereby connect the blade assembly to and position the blade assembly with respect to the one of the pump wheel outer shell and the turbine wheel outer shell; positioning the pump wheel and the turbine wheel adjacent to and facing one another; and disposing the stator means between the pump wheel and the turbine wheel.

The above discussed embodiments of the present invention will be described further hereinbelow with reference to the accompanying figures. When the word "invention" is used in this specification, the word "invention" includes "inventions", that is, the plural of "invention". By stating "invention", the Applicant(s) does/do not in any way admit that the present application does not include more than one patentably and non-obviously distinct invention, and maintains that this application may include more than one patentably and non-obviously distinct invention. The Applicant(s) hereby assert(s) that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the accompanying drawings, which illustrate one embodiment of the inventive blade assembly manufactured according to the inventive process, and wherein.

DESCRIPTION OF THE PREFERRED EMBODIMENT

Figure 1:
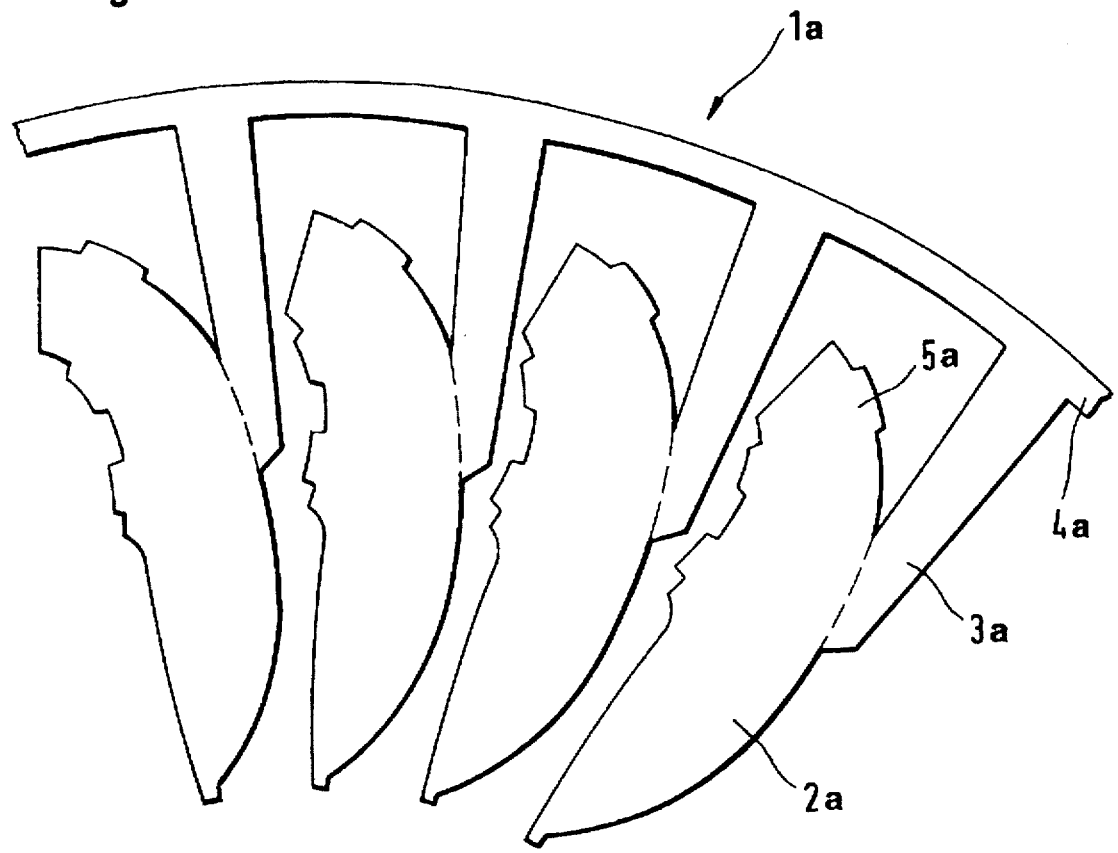
FIG. 1 is a partial plan view of the inventive blade assembly.

All of the blades 2a are stamped as blade blanks from a circular stamping blank 1a, whereby the contour of each blade 2a is essentially the same as that of a conventional blade. The stamping die is designed so that each blade 2a remains connected, via a web 3a, to a ring-shaped area 4a. After the stamping process, the assembly formed in this manner (i.e., the blade carrier or blade assembly) is subjected to a shaping process in which the blades 2a are adapted to their desired three-dimensional shape, and in which the ring-shaped area 4a is adapted to the contour of the housing that encases the impeller or pump wheel 11a or the turbine wheel 10a (shown in FIG. 4). This circular blade carrier (or blade assembly) is inserted into the corresponding housing part and is connected thereto by any conventional means.

Figure 2:
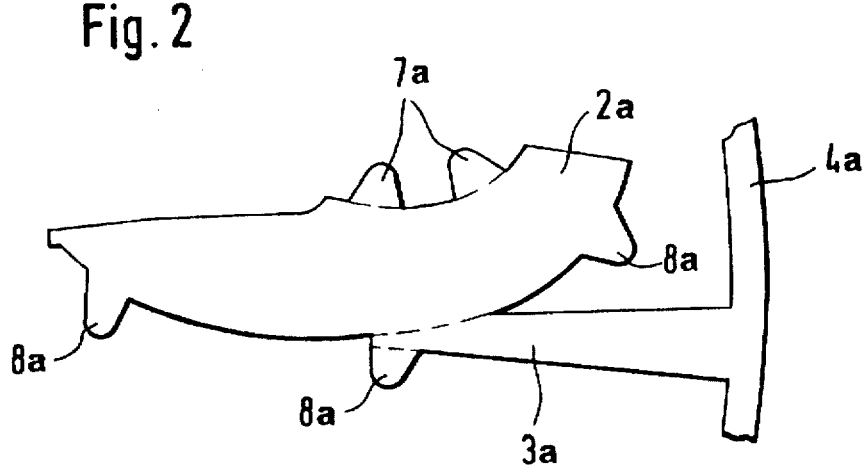
FIG. 2 is a plan view of an individual blade thereof.
Figure 3:
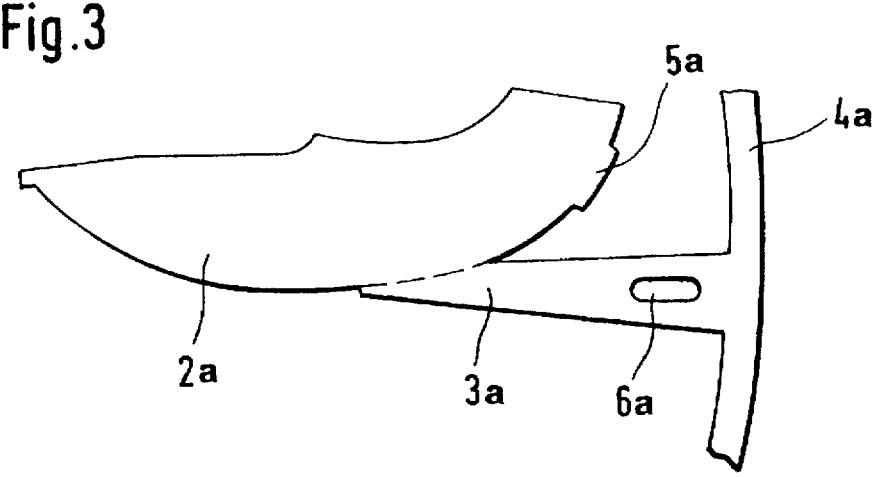
FIG. 3 shows an additional embodiment of a blade carrier, in a partial illustration.
Figure 4:
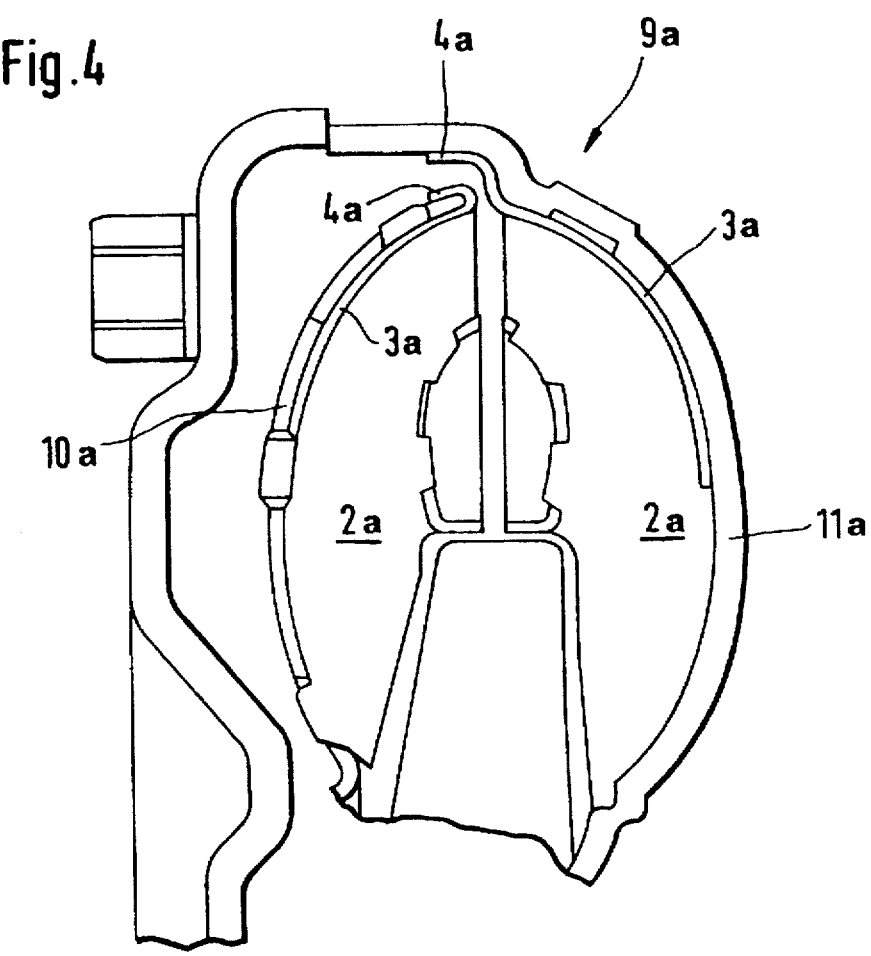
FIG. 4 shows a partial section of a hydrodynamic torque converter with two blade carriers installed.
Figure 6:
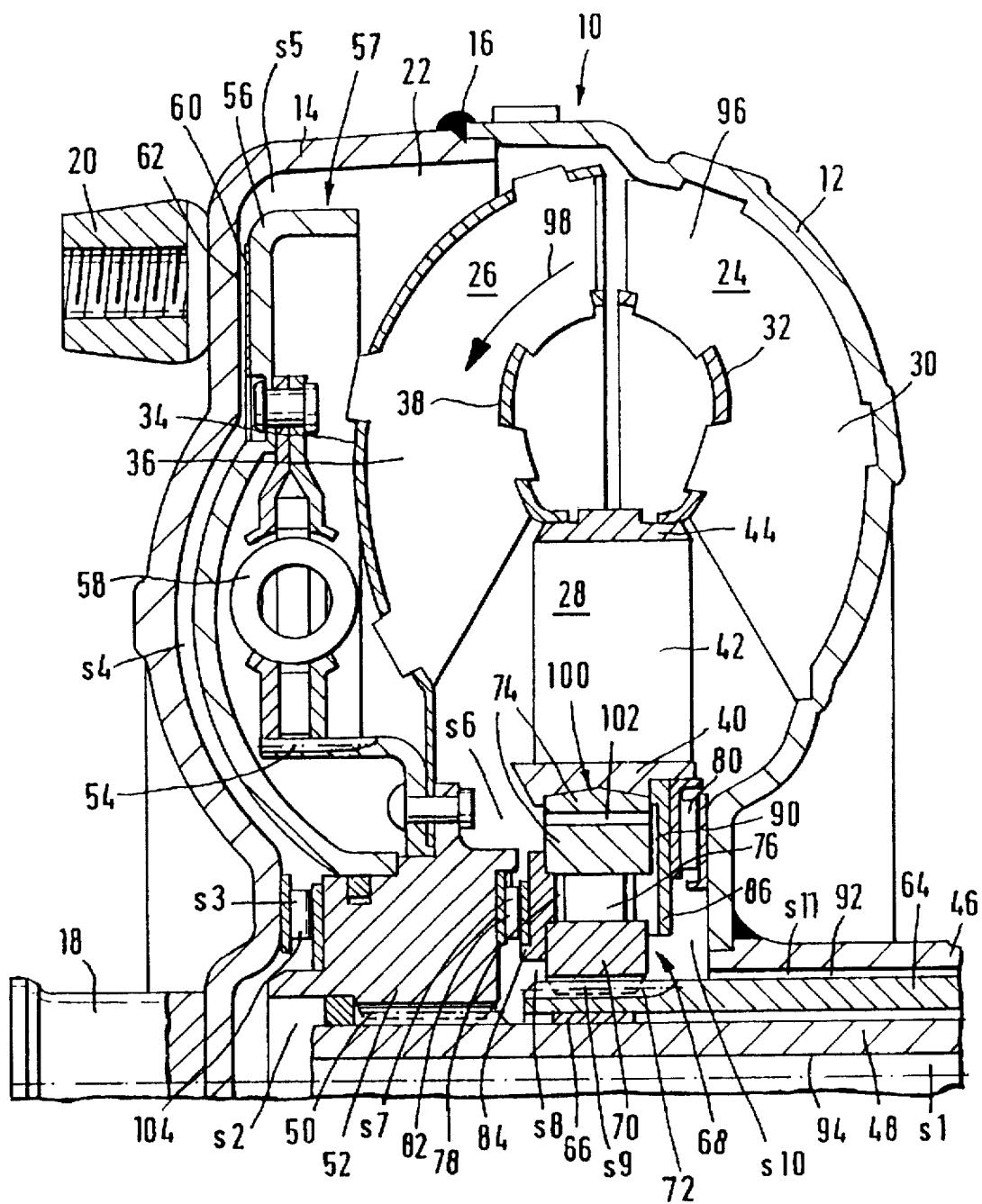
FIG. 6 is a cross-sectional view of a hydrokinetic torque converter which may be constructed utilizing at least one blade assembly of the present invention.

On the torque converter 9a illustrated in FIG. 4, the construction of which is known and is described further in connection with FIG. 6, the blade carrier illustrated in FIG. 1 is installed in the pump wheel 11a, and the blade carrier illustrated in FIG. 2 is installed in the turbine wheel 10a. Alternatively, the blade assembly illustrated in FIG. 1 can possibly be installed in the turbine wheel 10a, and the blade assembly illustrated in FIG. 2 can possibly be installed in pump wheel 11a. As shown in FIG. 3, in order to provide reinforcement and to increase the stability of the blade carrier, the web 3a can be provided with a slot-shaped recess 6a into which tabs 5a formed on the blade 2a during the stamping process can be inserted.

As on blades manufactured using other methods, the connecting or positioning devices used in conventional processes, such as the tabs for a rolled connection or butt ends for soldering or welding, can still be used. The ring-shaped area 4a can run radially outside or radially inside, as a function of the blade geometry selected. For example, in one embodiment, the ring-shaped area 4a can be positioned radially outside of the blades 2a so as to encircle the blades 2a as shown in FIGS. 1–3. Alternately, in another embodiment, the ring-shaped area 4a may be positioned radially inward of and encircled by the blades 2a. To achieve the required number of blades, two or more pre-fabricated blade carriers can also be installed in a housing, if necessary.

Figure 5:
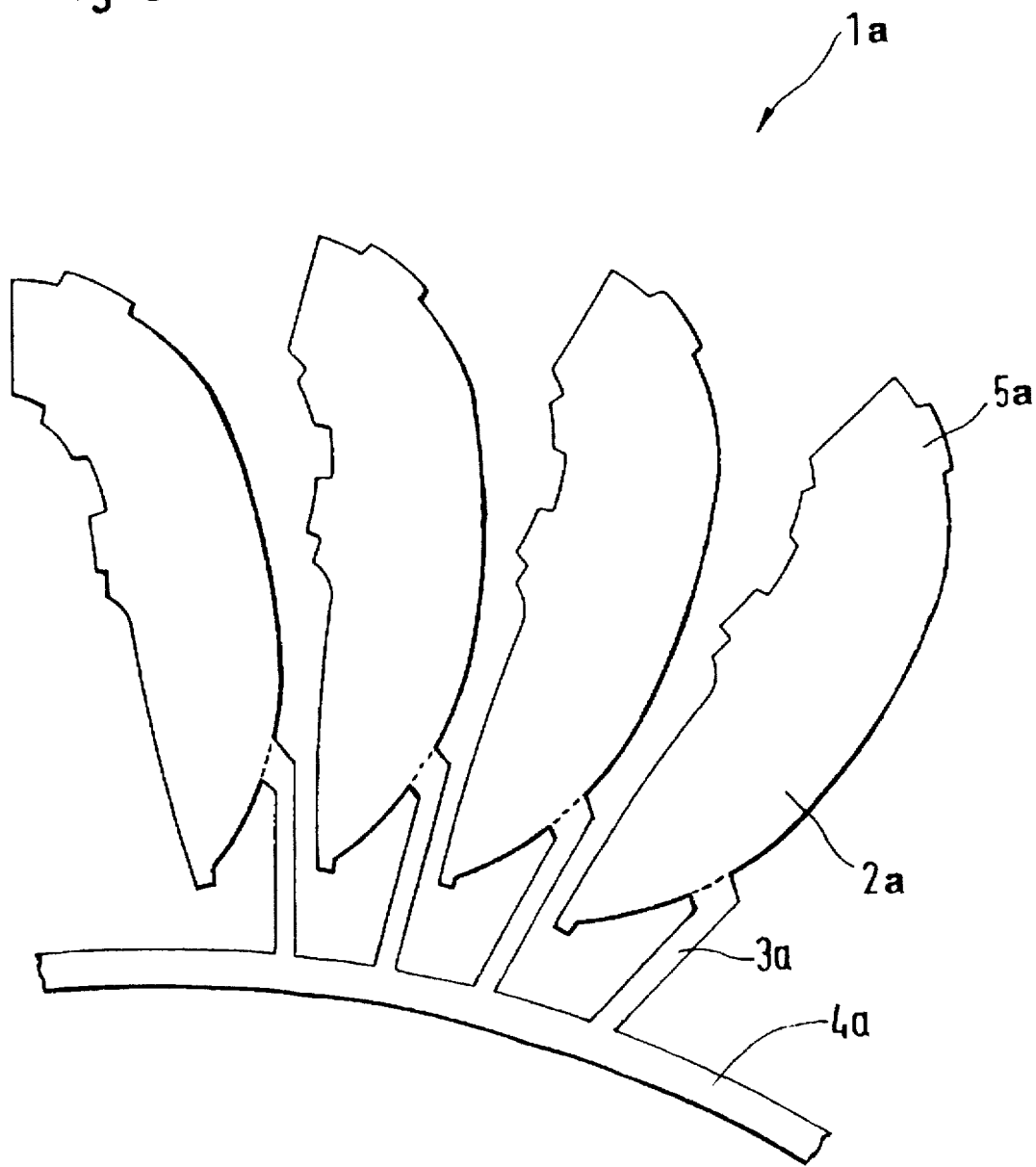
FIG. 5 is a partial plan view of an alternative embodiment of the inventive blade assembly.

FIG. 5 shows one alternative embodiment of the invention, wherein the ring-shaped area 4a is positioned radially inward of the individual blades 2a. In substantially all other aspects, the embodiment of FIG. 5 is similar to the embodiments of FIGS. 1–4 discussed above.

Also shown in FIG. 2 are tabs 7a which may optionally be provided for facilitating attachment of a concave annular ring to the blades of the pump wheel and/or turbine wheel.

Referring to FIG. 4, it will be appreciated that each of the pump wheel 11a and the turbine wheel 10a include an outer shell member, referred to herein as a "housing" of the pump wheel and/or turbine wheel. Within this outer shell member of the pump wheel 11a and/or turbine wheel 10a, the blade assembly described above is mounted through attachment of the ring-shaped area 4a, as described above. The ring-shaped area 4a functions as a connecting portion to which the individual blades 2a are connected via the web portions 3a during the forming (e.g., stamping) process and during the process in which the blades 2a are shaped into their desired configurations. As described herein, the connecting portion 4a is, in one embodiment of the invention, configured as a ring-shaped area 4a. However, other configurations are possible for the connecting portion 4a, for example, as an arcuate portion, that is, a portion of a ring.

Referring again to FIG. 4, as shown there and as will be understood by those of ordinary skill in the art, in many hydrokinetic torque converters, the housing of the pump wheel 11a is the same structural element as the housing of the overall hydrokinetic torque converter, while the housing of the turbine wheel 10a is usually a separate element from the housing of the overall hydrokinetic torque converter.

Referring back to FIG. 2, the embodiment of the blade 2a shown there includes additional tabs 8a which may be employed as an additional means for attaching the blade assembly to the corresponding pump wheel outer shell and/or turbine wheel outer shell.

FIG. 6 shows a converter housing of a hydrokinetic torque converter which is designated 10 in general, and which housing 10 is composed of two parts 12 and 14. These two parts 12 and 14 are tightly connected to one another, e.g. by means of welding 16. The converter housing 14 is welded to a shaft butt end 18, which is designed to be inserted into a bearing hole on the facing end of a crankshaft (not shown) of an internal combustion engine. There are also threaded bushings 20 on the converter housing part 14 for connection with the flywheel (not shown) which, for its part, can be attached to the crankshaft (not shown). The converter housing 10 encloses a hydraulic chamber 22. Inside this hydraulic chamber 22 there are an impeller 24, a turbine 26 and a stator 28. The impeller 24 is formed by the converter housing part 12, impeller blades 30 and an inside wall 32 of the ring; the turbine 26 is formed by an outside wall 34 of the ring, turbine blades 36 and an inside wall 38 of the ring. The stator 28 is formed by a stator hub 40, stator blades 42 and an inside wall 44 of the ring. The impeller 24 is mounted rotationally on one hand by means of the shaft butt end 18 in the crankshaft (not shown), and on the other hand by means of a tubular extension 46 on a stationary component, e.g. on the transmission housing of a transmission which is located downstream of the converter. Inside the converter housing 10, a connecting shaft 48 is rotationally mounted by means of its left end (not shown) in FIG. 1 in the converter housing 10, and connecting shaft 48 enters with its right end (not shown) into the transmission, to drive the transmission's input shaft or input gear wheel. A turbine hub 52 is mounted on the connecting shaft 48 by means of a gearing pair (or splined fitting) 50, which turbine hub 52 supports the turbine 26 by means of the outer wall 34 of the ring, and turbine hub 52 is axially supported by means of an axial bearing 104 on the converter housing part 14. A clutch plate guide 54 is riveted to the turbine hub 52, and a clutch plate 56 with a torsion damper 58 is movably guided on the clutch plate guide 54. The clutch plate 56 is realized with a friction lining 60 which is designed so that it comes into a frictional engagement with a friction surface 62 of the housing part 14.

Between the tubular extension 46 of the impeller 24 and the connecting shaft 48 there is a support tube 64 which is non-rotationally supported on the transmission housing (not shown), and support tube 64 contributes by means of an additional bearing shell 66 to the mounting of the connecting shaft 48. The stator hub 40 is supported by means of an overrunning clutch unit 68 on the support tube 64. The overrunning clutch unit 68 comprises a radially inner locking ring 70, which is non-rotationally supported by means of a gearing pair 72 on the support tube 64, plus an outer locking ring 74 which is cast into the stator hub 40, and locking bodies 76 in the space 78 between the two locking rings 70 and 74.

The stator hub 40 is supported on the side toward the impeller 24 by an impeller-side axial bearing 80, and on the side toward the turbine hub 52 by a turbine-side axial bearing 82.

One feature of the invention resides broadly in the method for the manufacture of blades for pump wheels and/or turbine wheels of a fluid coupling (or hydrolic clutch) in particular of a Föttinger coupling, or of a hydrodynamic torque converter for motor vehicles, characterized by the fact that all the required blades 2a are stamped in the form of blade blanks, out of a round stamping blank 1a in a single operating process, in such a manner that each blade blank remains connected, by means of a connecting web 3a, to a ring-shaped area 4a of the stamping blank 1a which remains intact during the stamping, the blade blanks are then subjected to a shaping process in which they are reshaped into the final three-dimensional shape of the blade 2a, whereby the connection with the ring-shaped area 4a remains intact, and in a shaping process, the ring-shaped area 4a is adapted to the contour of the housing that encases the pump wheel or turbine wheel 11a, 10a.

Another feature of the invention resides broadly in the blades for pump wheels and/or turbine wheels of a fluid coupling, in particular a Föttinger coupling, or of a hydrodynamic torque converter for motor vehicles, characterized by the fact that all the blades 2a are integrally connected to a carrier ring 4a and that the connection between each blade 2a and the carrier ring 4a is achieved by means of a web 3a.

Yet another feature of the invention resides broadly in the blades characterized by the fact that the carrier ring 4a is located radially inwardly in the assembly.

Still another feature of the invention resides broadly in the blades characterized by the fact that the carrier ring 4a is located radially outwardly in the assembly.

A further feature of the invention resides broadly in the blades characterized by the fact that the carrier ring 4a is adapted to the contour of the housing that encloses the pump wheel or turbine wheel 10a, 11a.

Another feature of the invention resides broadly in the blades characterized by the fact that the webs 3a have a slot-shaped recess 6a.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

Examples of torque converters in which the embodiment of the present invention could possibly be used may be found in the following documents: U.S. patent application Ser. No. 08/263,772 filed on Jun. 22, 1994 entitled "HYDROKINETIC TORQUE CONVERTER WITH LOCK-UP CLUTCH" having inventors Jurgen DEMGENSKY, Wilfried GLOCK, Horst JADICKE, Josef RIEDMANN, Bernd SCHODER, Friedrich SCHRAMM, and Johannes SOSSNITZA, which corresponds to Federal Republic of Germany patent applications No. P 43 20 768.5, filed on Jun. 23, 1993, and No. P 44 16 263.4, filed on May 7, 1994, which correspond to DE-OS 43 20 768.5 and DE-OS 44 16 263.4 and DE-PS 43 20 768.5 and DE-PS 44 16 263.4, respectively, which may have other equivalent or corresponding applications in the Federal Republic of Germany and elsewhere; U.S. patent application Ser. No. 08/263,995 filed on Jun. 22, 1994 entitled "HYDROKINETIC TORQUE CONVERTER" having inventors Jurgen DEGENSKY, Wilfried GLOCK, Horst JADICKE, Josef RIEDMANN, and Bernd SCHODER, which corresponds to Federal Republic of Germany patent application No. P 43 20 769.3, which corresponds to DE-OS 43 20 769.3 and DE-PS 43 20 769.3 which may have other equivalent or corresponding applications in the Federal Republic of Germany and elsewhere; U.S. patent application Ser. No. 08/358,852 filed on Dec. 19, 1994 entitled "HYDROKINETIC TORQUE CONVERTER WITH LOCKUP CLUTCH" having inventors Uwe DEHRMANN, Ruthard KNOBLACH, Wolfgang KUNDERMANN, Herbert SCHMID, Peter VOLLAND, and Hans Wilhelm WINEHOLT, which corresponds to Federal Republic of Germany patent applications No. P 44 23 640.9 filed on Jul. 6, 1994, and No. P 43 43 804.0, filed on Dec. 22, 1993, which correspond to DE-OS 44 23 640.9 and DE-OS 43 43 804.0, and DE-PS 44 23 640.9 and DE-PS 43 43 804.0, respectively, which may have other equivalent or corresponding applications in the Federal Republic of Germany and elsewhere; U.S. patent application Ser. No. 08/436,108 filed on May 8, 1995 entitled "HYDRODYNAMIC TORQUE CONVERTER WITH LOCKUP CLUTCH" having inventors Uwe DEHRMANN, Peter VOLLAND, and Hans-Wilhelm WIENHOLT, which corresponds to Federal Republic of Germany patent application No. P 44 16 153.0 filed on May 9, 1994, which corresponds to DE-OS 44 16 153.0 and DE-PS 44 16 153.0, which may have other equivalent or corresponding applications in the Federal Republic of Germany and elsewhere; U.S. patent application Ser. No. 08/527,760 filed on Sep. 13, 1995 entitled "HYDRODYNAMIC TORQUE CONVERTER WITH LOCK-UP CLUTCH" having inventors Uwe DEHRMANN, Peter VOLLAND, and Hans-Wilhelm WIENHOLT, which corresponds to Federal Republic of Germany patent application No. P 44 32 624.6 filed on Sep. 14, 1994, which corresponds to DE-OS 44 32 624.6 and DE-PS 44 32 624.6, which may have other equivalent or corresponding applications in the Federal Republic of Germany and elsewhere; U.S. patent application Ser. No. 08/541,061 filed on Oct. 11, 1995 entitled "HYDRODYNAMIC TORQUE CONVERTER WITH LOCKUP CLUTCH" having inventor Hans Wilhelm WIENHOLT, which corresponds to Federal Republic of Germany patent applications No. P 195 08 855.7, filed on Mar. 11, 1995, and No. P 44 36 276.5, filed on Oct. 11, 1994, which correspond to DE-OS 195 08 855.7 and DE-OS 44 36 276.5, and DE-PS 195 08 855.7 and DE-PS 44 36 276.5, respectively, which may have other equivalent or corresponding applications in the Federal Republic of Germany and elsewhere; and U.S. patent application Ser. NO. 08/204064 filed on Mar. 1, 1994 entitled "HYDROKINETIC LOCKUP TORQUE CONVERTER WITH LOCKUP CLUTCH" having inventor Joachim GIMMLER, which was issued Oct. 31, 1995, and which corresponds to Federal Republic of Germany patent application No. P 43 06 598.8, filed on Mar. 3, 1993, which corresponds to DE-OS 43 06 598.8 and DE-PS 43 06 598.8, which may have other equivalent or corresponding applications in the Federal Republic of Germany and elsewhere.

These patent and patent applications and their corresponding published patent applications, as well as their published equivalents, and other equivalents or corresponding applications, if any, and the references disclosed in any of the documents, publications, patents, and published patent applications cited herein, are hereby incorporated by reference as if set forth in their entirety herein. All of the above U.S. patent documents are assigned to Fichtel & Sachs AG of the Federal Republic of Germany.

Types of torque converters and components therefor, which may be utilized in accordance with the embodiments of the present invention may be found in the following U.S. patents: U.S. Pat. No. 4,478,323 to Weissenberger on Oct. 23, 1984, entitled "Hydrodynamic Clutch with Torsional Vibration Damping"; U.S. Pat. No. 4,437,551 to Gimmler on Mar. 20, 1984, entitled "Hydrodynamic Torque Converter"; U.S. Pat. No. 5,065,853 to Fujimoto et al. on Nov. 19, 1991, entitled "Lockup Clutch of Torque Converter"; U.S. Pat. No. 4,468,989 to Rosen on Sep. 4, 1984, entitled "Power Transmission Mechanism with a Hydrokinetic Torque Converter Having a Lockup Clutch"; U.S. Pat. No. 4,382,496 to Yamamori et al. on May 10, 1983, entitled "Torque Converter with Lockup Clutch Unit"; and U.S. Pat. No. 4,071,125 to Jameson on Jan. 31, 1978, entitled "Power Transmission with Torque Converter Lockup Clutch".

Types of torque converters in which the present invention may be incorporated may be disclosed by the following patents: U.S. Pat. No. 4,263,822 to Harmon on Apr. 28, 1981, entitled "Multirange Transmissions"; U.S. Pat. No. 3,953,970 to Fuehrer et al. on May 4, 1976, entitled "Torque Converter Transmission"; U.S. Pat. No. 5,065,853 to Fujimoto et al. on Nov. 19, 1991, entitled "Lockup Clutch of Torque Converter"; U.S. Pat. No. 4,468,989 to Rosen on Sep. 4, 1984, entitled "Power Transmission Mechanism with a Hydrokinetic Torque Converter Having a Lockup Clutch"; U.S. Pat. No. 4,382,496 to Yamamori et al. on May 10, 1983, entitled "Torque Converter with Lockup Clutch Unit"; U.S. Pat. No. 4,071,125 to Jameson on Jan. 31, 1978, entitled "Power Transmission with Torque Converter Lockup Clutch".

The corresponding foreign patent publication applications, namely, Federal Republic of Germany Patent Application No. 195 13 17.2, filed on Apr. 10, 1995, having inventor Rüdiger Hinkel, and DE-OS 195 13 517.2 and DE-PS 195 13 517.2, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A hydrokinetic torque converter, such as for a motor vehicle, the motor vehicle including a power output shaft, said hydrokinetic torque converter comprising:
a pump wheel, said pump wheel comprising:
a pump wall;
said pump wall comprising a first inner portion;
said first inner portion for being disposed substantially adjacent to said power output shaft;
a pump wheel outer shell; and
a plurality of pump blades connected to said pump wheel outer shell;
said pump wheel for being connected to a source for providing power;
a turbine wheel, said turbine wheel comprising:
a turbine wall;
said second turbine wall comprising a second inner portion;
said second inner portion for being disposed substantially adjacent to said power output shaft;
a turbine wheel outer shell; and
a plurality of turbine blades connected to said turbine wheel outer shell;
said pump wheel and said turbine wheel being disposed such that said plurality of said pump blades of said pump wheel and said plurality of said turbine blades of said turbine wheel are adjacent to and face one another;
said pump wheel outer shell and said turbine wheel outer shell enclosing said pump blades and said turbine blades being adjacent to and facing one another;
said turbine wheel being connected to and for driving said power output shaft;
stator means, said stator means being disposed between said turbine wheel and said pump wheel;
said stator means comprising an overrunning clutch unit; and
at least one of said plurality of pump blades and said plurality of turbine blades comprising a blade assembly positioned within one of said pump wheel outer shell and said turbine wheel outer shell, said blade assembly comprising:
at least two blade portions;
a connecting portion disposed adjacent said at least two blade portions; and
a web portion connecting each of said at least two blade portions to said connecting portion;
said at least two blade portions, said connecting portion and said web portions all being formed from a single sheet of material;
said connecting portion of the said blade assembly being attached to said one of said pump wheel outer shell and said turbine wheel outer shell to thereby connect said blade assembly to and position said blade assembly with respect to said one of said pump wheel outer shell and said turbine wheel outer shell;
said connecting portion of said blade assembly comprises a contour configured for attachment to said one of said pump wheel outer shell member and said turbine wheel outer shell member;
said connecting portion comprises an arcuate portion; and
said arcuate portion comprises a ring-shaped member.

2. A hydrokinetic torque converter according to claim 1, wherein at least one of said web portions is provided with a slot shaped opening.

3. A hydrokinetic torque converter according to claim 2, wherein said ring-shaped member is disposed radially outward of said at least two blade portions.

4. A hydrokinetic torque converter according to claim 2, wherein said ring-shaped member is disposed radially inward of said at least two blade portions.

5. A method of manufacturing a hydrokinetic torque converter, the hydrokinetic torque converter including a pump wheel, a turbine wheel, and stator means, the pump wheel including a pump wheel outer shell and a plurality of pump blades connected to said pump wheel outer shell, the turbine wheel including a turbine wheel outer shell and a plurality of turbine blades connected to the turbine wheel outer shell, the stator means including an overrunning clutch unit, said method comprising the steps of:
forming a blade assembly in a forming process, the blade assembly comprising:

at least two blade portions;

a connecting portion disposed adjacent said at least two blade portions; and a web portion connecting each of said at least two blade portions to said connecting portion;

said at least two blade portions, said connecting portion and said web portions all being formed from a single sheet of material;

shaping said at least two blade portions into a final configuration while said at least two blade portions are still connected to said connecting portion by said web portions;

attaching said connecting portion of said blade assembly to one of said pump wheel outer shell and said turbine wheel outer shell to thereby connect said blade assembly to and position said blade assembly with respect to said one of said pump wheel outer shell and said turbine wheel outer shell;

positioning said pump wheel and said turbine wheel adjacent to and facing one another;

disposing said stator means between said pump wheel and said turbine wheel;

shaping said connecting portion of said blade assembly to a contour configured for attachment to said one of said pump wheel outer shell member and said turbine wheel outer shell member;

said connecting portion comprises an arcuate portion; and said arcuate portion comprises a ring-shaped member.

6. A method of manufacturing a hydrokinetic torque converter according to claim 5, said method further comprising the additional step of providing at least one of said web portions with a slot shaped opening.

7. A method of manufacturing a hydrokinetic torque converter according to claim 6, wherein said forming process for forming said blade assembly comprises a stamping process wherein said blade assembly is stamped from a stamping blank.

8. A method of manufacturing a hydrokinetic torque converter according to claim 7, wherein said stamping blank comprises a substantially round stamping blank.

9. A method of manufacturing a hydrokinetic torque converter according to claim 8, wherein said ring-shaped member is disposed radially outward of said at least two blade portions.

10. A method of manufacturing a hydrokinetic torque converter according to claim 8, wherein said ring-shaped member is disposed radially inward of said at least two blade portions.

* * * * *